United States Patent [19]

Wahl et al.

[11] Patent Number: 4,520,952
[45] Date of Patent: Jun. 4, 1985

[54] FLEXIBLE SLEEVE FOR BIN ACTIVATOR

[76] Inventors: Richard C. Wahl, 66 Holton La., Essex Falls, N.J. 07021; Eugene R. Wahl, 40 Lynwood Rd., Cedar Grove, N.J. 07009

[21] Appl. No.: 506,381

[22] Filed: Jun. 21, 1983

[51] Int. Cl.³ ............................................. B65G 65/44
[52] U.S. Cl. ..................................... 222/199; 285/236
[58] Field of Search .............. 222/160, 161, 198, 199, 222/202, 203, 502, 503, 196, 200; 24/20 TT, 20 LS, 21, 274, 278, 279, 280–282; 285/236

[56] References Cited

U.S. PATENT DOCUMENTS

| | | | |
|---|---|---|---|
| 3,233,922 | 2/1966 | Evans | 285/236 |
| 3,261,508 | 7/1966 | Wahl | 222/199 |
| 3,516,694 | 6/1970 | Schwartz | 285/236 |
| 3,873,135 | 3/1975 | Kreitzberg | 285/236 X |
| 4,146,082 | 3/1979 | Granger | 285/236 X |
| 4,276,157 | 6/1981 | Haight | 222/199 X |
| 4,285,447 | 8/1981 | Fairbank | 222/200 |
| 4,420,176 | 12/1983 | Cornwall | 285/236 X |

Primary Examiner—Joseph J. Rolla
Assistant Examiner—Michael S. Huppert
Attorney, Agent, or Firm—John W. Logan, Jr.

[57] ABSTRACT

There is disclosed a flexible sleeve to fit over the lower flange of a storage bin and the upper flange of a vibratory bin activator to span the gap between these two flanges and prevent leakage of material from the bin through this gap. The sleeve has upper and lower pairs of spaced circumferential ribs to receive strap-like clamping members and to hold the clamping members in place during assembly and after assembly and during use of the bin activator.

4 Claims, 4 Drawing Figures

U.S. Patent   Jun. 4, 1985   4,520,952

FLEXIBLE SLEEVE FOR BIN ACTIVATOR

BACKGROUND OF THE INVENTION

This invention relates to bin activator apparatus adapted for attachment to a storage bin or hopper to promote a positive flow of material therefrom. In particular, it relates to improved means for connecting the bin activator to the storage hopper.

The design of storage bins, per se, has been the subject of extensive and thorough research, both mathematical and empirical. However, experts in this field have found that in spite of the best bin designs, a dependable outflow of the material cannot be obtained without the use of auxiliary devices operatively associated with the bin.

One apparatus which has had marked commercial success in meeting the above-described bin discharge problem is described in U.S. Pat. No. 3,261,508 for a Vibrating Bin Activator, which issued July 19, 1966. That apparatus overcomes the shortcomings of the prior art devices. The apparatus is adapted for attachment to the bottom of a storage bin. Such apparatus is subjected to vigorous vibration and accomplishes the task of removing a wide variety of materials from bins in a controlled manner.

That novel apparatus was designed for attachment to the bottom of a storage bin having a discharge opening in its bottom, being broadly depicted in FIG. 3 of the patent.

It comprises a material receiving means having concave side walls terminating in an outlet opening, means for forming an annular opening defining a flow path for material dropping from the bin into the material receiving means, means for imparting cyclic vibrations to the receiving means and means for securing the vibratory apparatus in operative association with the hopper.

As will be better seen in FIG. 4 of the Wahl '508 patent, a necessary horizontal gap or opening is provided between the lower end of the bin and the vibratory activator, by the appropriate spacing of vertical tie rods. The suspension of the hopper activator from the bin with the associated vibration isolators permits relatively free vibration in response to the cyclic thrust forces applied to the hopper by the eccentrically mounted weight of the gyrator assembly.

It is the coupling means for the abutting hopper flange and activator apparatus flange to which the present invention is addressed.

It is an object of this invention to provide a more effective sealing means for coupling of bin and activator while in operation.

It is another object to provide a novel circumferential sleeve which can be installed or replaced effectively by one worker.

It is still another object to provide a coupling sleeve that will not slip from position due to the displacing tendency of the vibrating bin activator.

It is a yet further object to provide a configuration for a sleeve that will insure the proper installation of the metal bands which serve to retain the sleeve in operating position through repeated vibratory cycles.

DESCRIPTION OF THE DRAWINGS

In the drawings, like reference numbers denote like components of the apparatus.

DETAILED DESCRIPTION OF THE INVENTION

Figure 1:
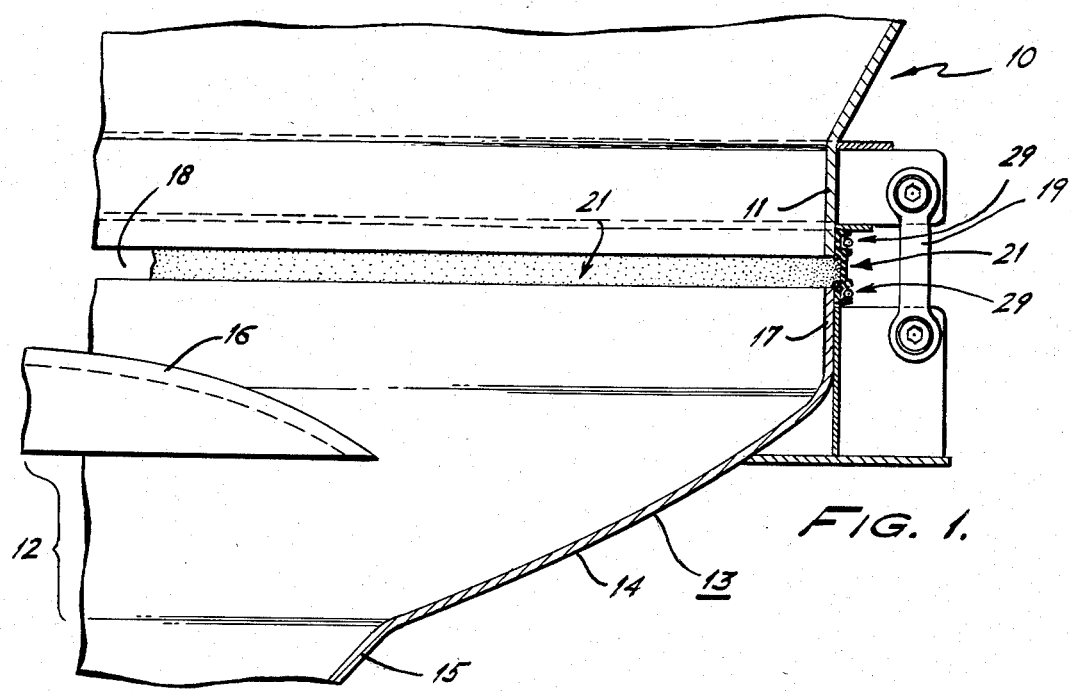
FIG. 1 is a fragmentary view of a bin hopper and cooperating vibratory apparatus, showing in elevation and full section one lower quadrant of the assembly.

In FIG. 1, there is shown the bottom inwardly tapered conical portion 10 of a large storage bin, which portion 10 terminates in a cylindrical annular flange 11. To control and promote flow from the bin, a bin activator 12, such as described in the aforementioned Wahl '508 patent, is provided. This bin activator 12 includes a material receiving member 13 having shallow and steeper concave sections 14 and 15, respectively. A baffle 16 is supported within the material receiving member and the entire bin activator is vibrated by a conventional vibrator, not shown. The upper end of the material receiving member 13 terminates in an upwardly extending cylindrical flange 17 of a diameter equal to that of the bin flange 11 and is axially spaced from the bin flange to provide a narrow uniform gap 18 therebetween. A series of circumferentially spaced hanger arms 19 suspend the bin activator from the storage bin to permit limited horizontal movement of the bin activator when the vibrator is operating.

In accordance with the present invention, a flexible sleeve 21 is provided to be secured to the flanges 11 and 17 of the bin and bin activator, respectively, and close the gap 18 between these two flanges for the purpose of preventing material leakage through this gap and invasion of moisture into the material within the bin. This sleeve preferably is formed of a gas impervious, elastomeric compound and may be reinforced with one or more layers of fabric.

Figure 2:
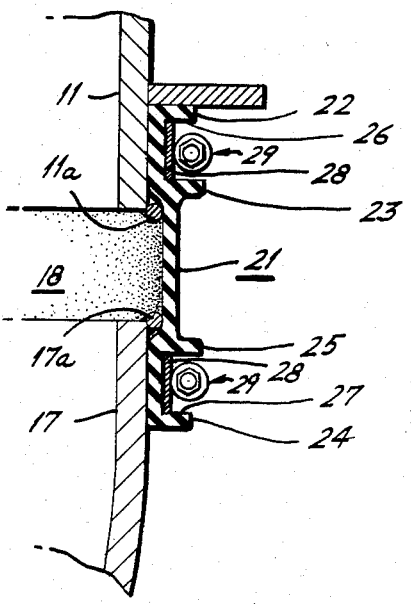
FIG. 2 is an elevational view in full vertical section of the configuration of the flanges, the sealing sleeve and retaining clamps.
Figure 3:
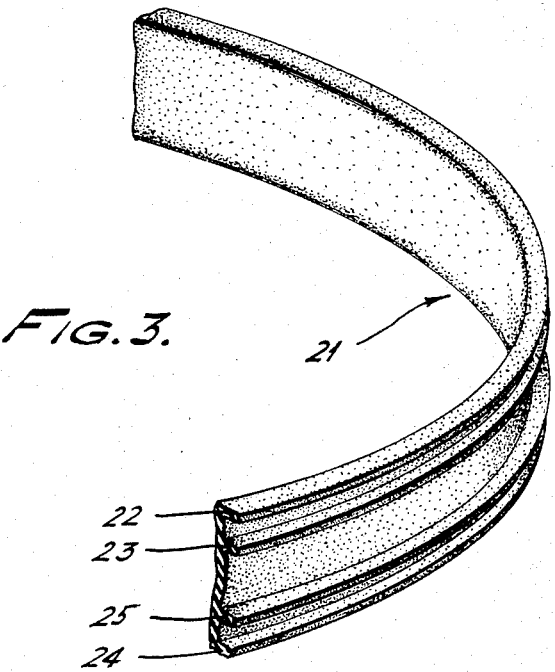
FIG. 3 is a perspective view of a portion of the deformable sleeve of this invention which surrounds the spacing in the flanges.

As shown in FIG. 2, the sleeve is positioned to span and seal the gap 18 with approximately equal extents of the sleeve 21 engaging the bin flange 11 and the bin activator flange 17. To additionally assist in maintaining the sleeve in place, annular metallic wires or beads 11a and 17a may be welded or otherwise secured about the entire periphery of the terminal ends of the flanges 11 and 17, respectively.

An important feature of the present invention is the provision of upper and lower pairs of outwardly extending flanges with the upper pair comprising an upper flange and upper intermediate flange 22 and 23, respectively, and the lower pair comprising a lower flange and lower intermediate flange 24 and 25, respectively. The upper and lower intermediate flanges are positioned so that when the sleeve is installed, the upper intermediate flange 23 is positioned above the bin flange bead 11a and the lower intermediate flange 25 is positioned immediately below the bin activator flange bead 17a.

The flanges of each pair are spaced to form upper and lower channels 26 and 27, respectively, extending about the exterior of the sleeve, which are dimensioned to receive, when the sleeve is installed, adjustable metallic clamp bands 28. The provision of these upper and lower pairs of flanges in the sleeve serves a dual function.

Figure 4:
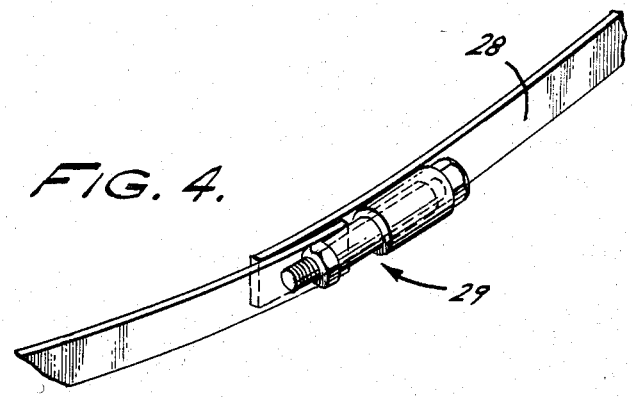
FIG. 4 is a partial perspective view of the clamp band and adjustable bolt used to retain the sleeve in operating position.

First, they rigidify that portion of the sleeve which engages the flanges 11 and 17, respectively, immediately above and below the flange beads so that when the clamps are tightened, as shown in FIG. 2, they resist relative axial movement of the sleeve with respect to the flanges. In addition, the flanges serve the function of permitting relatively easy installation of the sleeve by one workman. Bin activators of the type disclosed herein may be as large as 12 to 14 feet in diameter and it is necessary to place single lengths of the clamping band entirely about the upper and lower portions of the sleeve. The recesses provided by the sleeve flanges permit easy installation of these clamping bands and hold the bands in position while they are being stretched around the sleeve and tightened. After the sleeves are placed in position, they are firmly clamped around the sleeves within the recesses 26 and 27 by means of an adjustable clamping member such as shown at 29 in FIG. 4.

While a particular embodiment of the present invention has been illustrated and described herein, it is not intended to limit the invention to such a disclosure, and changes and modifications may be incorporated therein within the scope of the following claims.

What is claimed is:

1. A sealing sleeve assembly for sealing the gap between a cylindrical flange on the bottom of a storage bin and similar diameter cylindrical flange on the upper end of a bin activator, said assembly including:
   (a) a flexible sleeve of generally cylindrical shape having a diameter and axial length such to closely overlie the bin and bin activator flanges and span the gap therebetween;
   (b) upper and lower pairs of laterally extending circumferential ribs defining therebetween upper and lower channels respectively, each of said channels having straight parallel sides extending at right angles to the sleeve;
   (c) upper and lower clamp bands received within said upper and lower channels respectively, to securely clamp said sleeve to the cylindrical flanges of said storage bin and bin activator, said clamp bands having a width substantially equal to the width of said channels and a thickness less than the depth of said channels so that while the sealing sleeve is secured to the cylindrical flanges said clamp bands are frictionally retained within said channels; and
   (d) said upper and lower channels spaced apart a distance greater than the gap between the storage bin cylindrical flange and the bin activator cylindrical flange spanned by said sealing sleeve.

2. Apparatus in accordance with claim 1 wherein each of said cylindrical flanges has a wire bead secured to its outer surface adjacent its terminal end, said upper channel being positioned about the storage bin cylindrical flange above the wire bead thereon and said lower channel being positioned about the bin activator cylindrical flange below the wire bead thereon.

3. Apparatus in accordance with claim 1 wherein adjusting means are provided on each of said clamp bands to permit tightening of said bands about said sleeve.

4. Apparatus in accordance with claim 1 wherein said flexible sleeve is formed of a gas impervious elastomeric material.

* * * * *